United States Patent [19]

Leary et al.

[11] Patent Number: 4,954,223

[45] Date of Patent: Sep. 4, 1990

[54] DISTILLATION APPARATUS

[76] Inventors: Joseph E. Leary, 10994 Terrace Dr., Forrestville, Calif. 95436; Edward L. Parr, 301 Cuyamaca St., El Cajon, Calif. 92020

[21] Appl. No.: 225,736

[22] Filed: Jul. 29, 1988

[51] Int. Cl.$^5$ .......................... B01D 1/28; B01D 3/10
[52] U.S. Cl. ..................................... 203/1; 159/24.2; 159/43.2; 159/47.1; 159/DIG. 16; 159/DIG. 42; 202/83; 202/164; 202/172; 202/181; 202/189; 202/193; 202/205; 202/237; 202/268; 202/269; 203/11; 203/24; 203/26; 203/91; 203/DIG. 8; 203/DIG. 9
[58] Field of Search .......... 203/11, 91, 1, 87, DIG. 9, 203/DIG. 18, DIG. 17, DIG. 25, 24, 26, DIG. 8; 159/DIG. 42, DIG. 16, 47.1, 43.2, 24.2, 25.2, 27.1, DIG. 41; 202/181, 83, 189, 164, 205, 172, 193, 237, 268, 269, 175, 176, 265

[56] References Cited

U.S. PATENT DOCUMENTS

| | | | |
|---|---|---|---|
| 1,204,716 | 11/1916 | Thorssell | 203/11 |
| 3,338,798 | 8/1967 | Parr | 203/11 |
| 3,420,745 | 1/1969 | Schlueter | 159/903 |
| 3,826,718 | 7/1974 | Takayasu | 159/43.2 |
| 4,295,773 | 10/1981 | Dhondt | 202/262 |
| 4,304,609 | 12/1981 | Morris | 202/118 |
| 4,569,724 | 2/1986 | Firestone | 159/DIG. 42 |
| 4,604,019 | 8/1986 | Deering | 202/262 |

FOREIGN PATENT DOCUMENTS 2129775 12/1972 Fed. Rep. of Germany ...... 202/205

*Primary Examiner*—Virginia Manoharan
*Attorney, Agent, or Firm*—Brown, Martin, Haller & McClain

[57] ABSTRACT

A distillation apparatus including a pair of vertical lower vessels each open at its upper end, and a pair of elongate upper vessels each having an open lower end, slidably mounted in a respective one of the lower vessels. A heat exchanger is mounted in each of the upper vessels, with the upper end of one upper vessel being connected to the inlet of the heat exchanger in the other vessel, and vice versa. A reciprocating drive mechanism drives the two upper vessels up and down in opposite directions so as to simultaneously effect compression in the space above the liquid level in the downwardly moving vessel while expanding the space above the liquid in the other vessel, driving vapor from the downwardly moving vessel into the heat exchanger in the other vessel, where it condenses.

7 Claims, 2 Drawing Sheets

DISTILLATION APPARATUS

BACKGROUND OF THE INVENTION

The present invention relates generally to a distillation apparatus for removing impurities or solids from liquids, for example for desalinating salt water or for removing solids from sewage.

In U.S. Pat. No. 3,338,798 of Parr an alternating still desalination apparatus is described which comprises two inverted containers with their lower, open ends submerged in sea water. Each container contains a heat exchanger disposed in the sea water, and the upper end of one container is connected to the heat exchanger in the other container, and vice versa. A reciprocating drive mechanism is provided for simultaneously lowering one container while raising the other container, so that the vapor pressure in the space above the water level in the lowered container is raised, super heating the vapor in that space and forcing it out into the heat exchanger in the other container, while the pressure will drop in the upwardly moving container, causing the water in that container to vaporize. Vapor forced out of one container into the heat exchanger coil of the other container is condensed and distilled water is delivered at the heat exchanger outlet. The disadvantage of this apparatus is that it must be partially submerged in a body of water, such as sea water, and thus must be situated at an appropriate site where it can be submerged. Also, valuable minerals in the sea water cannot be recovered. An alternative embodiment is described, in which two closed and stationary containers are provided which are connected via a piston and cylinder arrangement for alternately increasing and decreasing the pressures in the two containers.

SUMMARY OF THE INVENTION

It is the object of the present invention to provide an improved distillation apparatus.

According to the present invention, a distillation apparatus is provided which comprises a pair of vertically arranged, side by side, elongate upper vessels each having a closed upper end and an open lower end, and a pair of lower vessels each having an open upper end, a first one of the upper vessels being slidably mounted at its lower end in a first one of the lower vessels, and the second one of the upper vessels being slidably mounted at its lower end in the second one of the lower vessels. A first heat exchanger is mounted in the first upper vessel, and a second heat exchanger is mounted in the second upper vessel. A first conduit connects the upper end of the first upper vessel with the inlet of the second heat exchanger, while a second conduit connects the upper end of the second upper vessel with the inlet of the first heat exchanger. Outlet conduits are connected to the outlets of both heat exchangers, and inlets are provided for connecting the vessels to a supply of liquid to be distilled.

A reciprocating drive assembly is provided for alternately driving the upper vessels up and down in opposite directions in the respective lower vessels to effect partial vacuum in the space above the liquid level in the uppermost of the two upper vessels in each cycle while effecting compression in the space above the liquid level in the lower of the two upper vessels. The pressure will thus alternately increase and decrease in each of the vessels as they are driven up and down. The liquid in the vessels is pre-heated to produce vapor in the space above the liquid level in each vessel, and as one of the vessels is driven downwardly, the vapor will be compressed, increasing the vapor pressure in the space. The vapor thus generated will be conducted through the conduit into the heat exchanger in the other vessel, which will at that time be moving upwardly, decreasing the pressure in the space in that container. The vapor entering the heat exchanger will be cooled and will condense and pass through the heat exchanger to the outlet. The same process occurs in the opposite direction between the vessels in the next stroke, when the vessels are driven in the opposite direction.

Any solids in the liquid filling the vessels will tend to settle to the bottom of the lower vessels, where it can be drained off or otherwise separated. This apparatus can be used, for example, for desalinating salt or brackish water or for other purification purposes.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
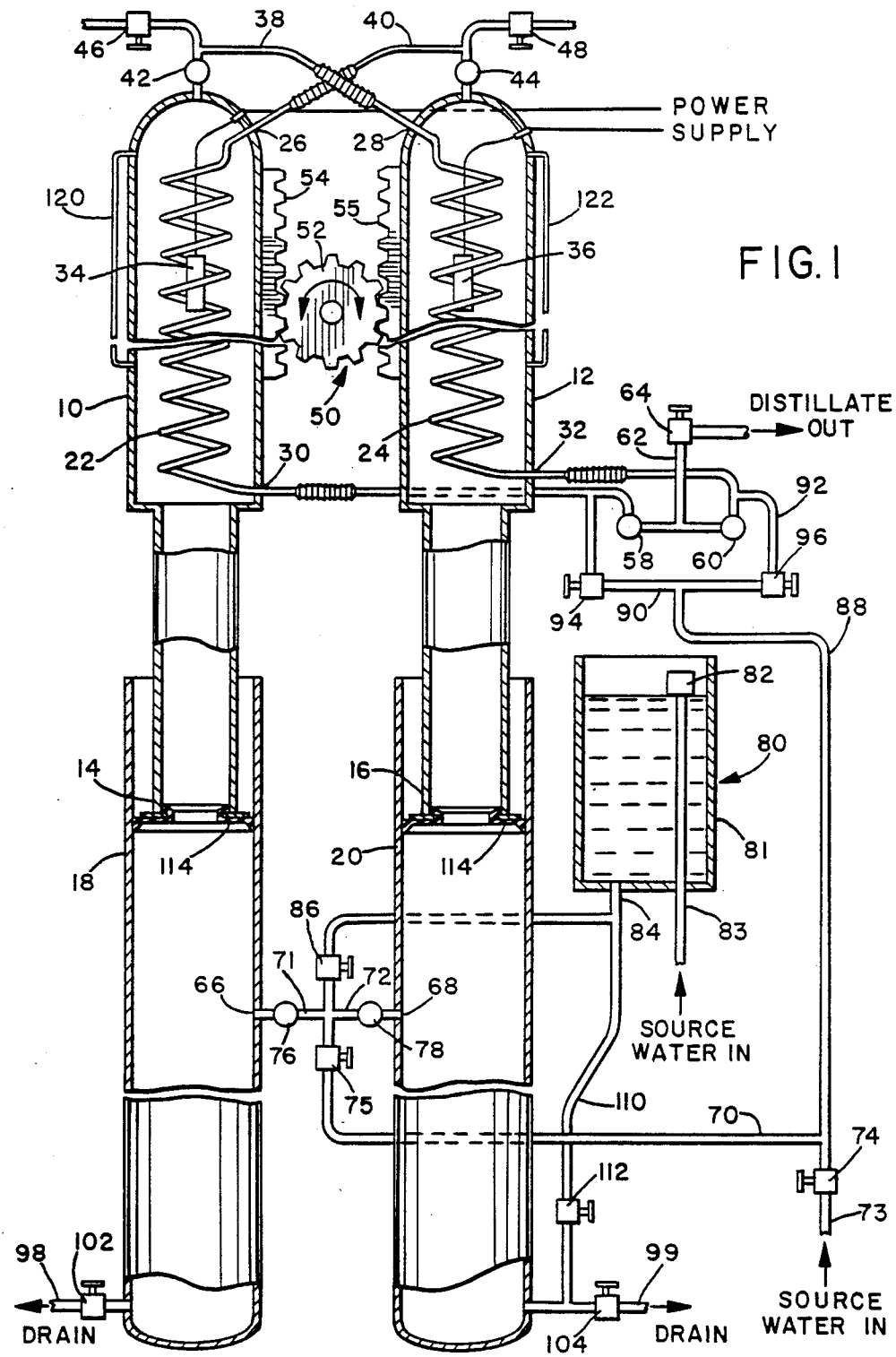
FIG. 1 is a side elevation view, with portions cut away, of the distillation apparatus according to a preferred embodiment of the present invention.

Referring to the drawings, FIG. 1 shows a distillation apparatus according to a preferred embodiment of the present invention. The apparatus basically comprises a pair of vertically arranged, elongate upper vessels 10 and 12 each open at their lower ends 14 and 16 which are slidably mounted in the open upper ends of a pair of lower vessels 18 and 20, respectively.

Figures 2, 3:
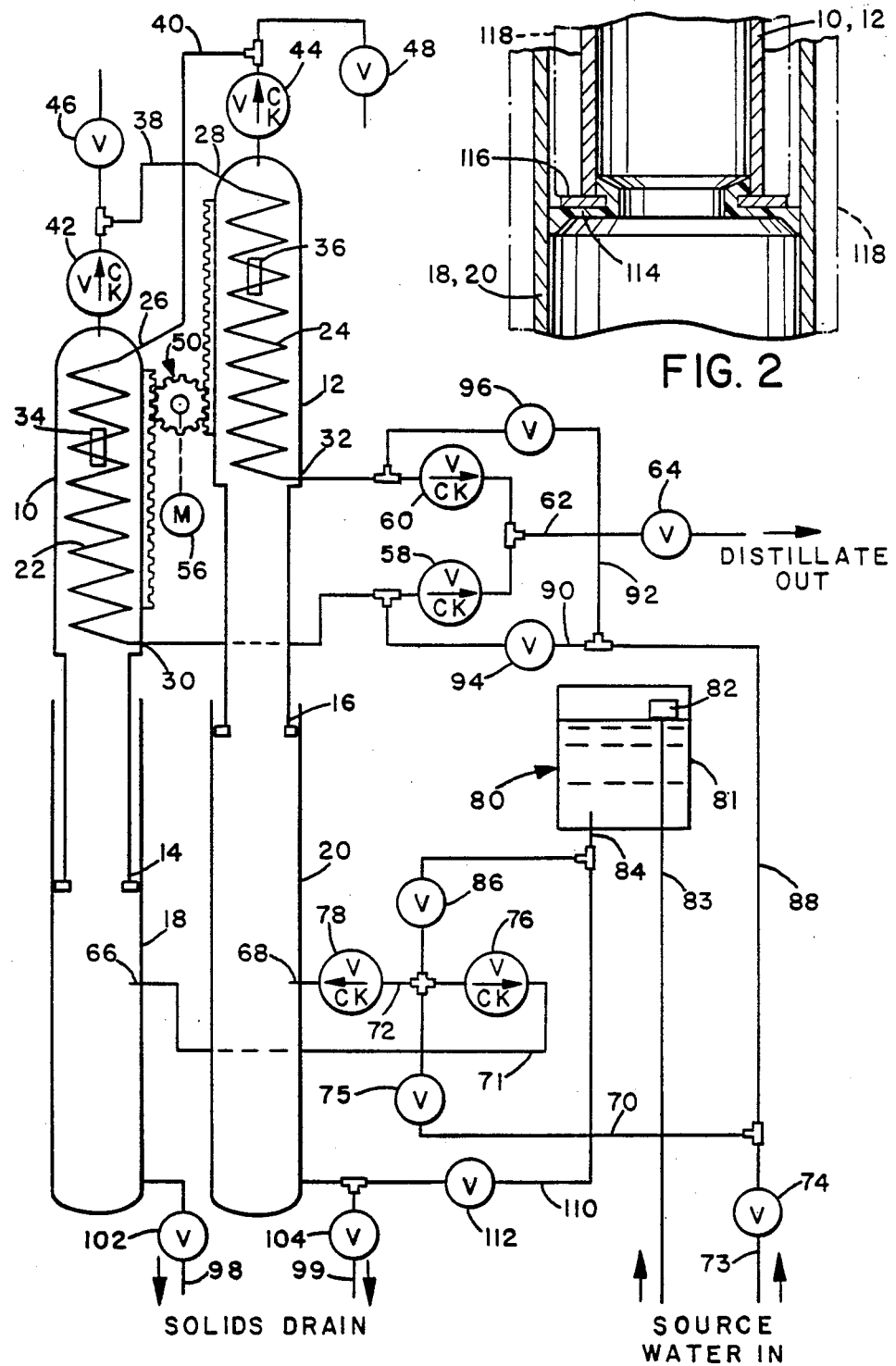
FIG. 2 is an enlargement showing the piston-like sliding engagement of one of the upper vessels in FIG. 1 in the respective lower vessel.
FIG. 3 is a schematic of the operating system.

FIG. 2 shows the sliding engagement between one of the upper vessels and the corresponding lower vessel in more detail. A suitable sealing ring 114 is mounted at the lower end of the upper vessel and fits over flange 116. The ring 114 is in slidable sealing engagement with the lower vessel to prevent leakage around the seal as the upper vessel slides up and down. The upper and lower vessels are preferably provided with a thermally insulating outer layer or coating 118 of suitable material. Preferably, a sight tube 120 and 122 is provided on each of the upper vessels, as shown in FIG. 1, to allow the operator to check the level of liquid in the vessels.

The upper vessels are each closed at their upper ends, and a heat exchanger or condenser coil 22 and 24 is mounted in each of the upper vessels. Each heat exchanger has an inlet 26 and 28 at its upper end and an outlet 30 and 32 at its lower end. Suitable starter heaters or heating elements 34 and 36 are disposed in the upper vessels 10 and 12 respectively adjacent the coils of the respective heat exchangers. Conduits 38 and 40, respectively, connect the upper end of each upper vessel to the inlet 26 and 28 of the heat exchanger in the other vessel. Each conduit 38 and 40 contains a check valve 42 and 44, to prevent liquid from flowing from the respective heat exchangers into the vessels. Priming bleed valves 46 and 48 are provided in bypass outlets from each of the conduits for bleeding air from the system, as explained in more detail below.

A suitable reversible drive assembly 50 is provided for alternately driving the upper vessels up and down in opposite directions in the lower vessels. The drive assembly shown schematically in FIGS. 1 and 3 of the drawings comprises a toothed gear wheel 52 which engages corresponding vertically extending teeth 54 and 55 on each of the upper vessels and is driven alternately in opposite directions by motor 56. When the wheel 52 rotates in a clockwise direction as viewed in the drawings, vessel 10 will be driven upwards while vessel 12 is driven downwards, and when wheel 52 is reversed, the vessels 10 and 12 will move down and up, respectively, in opposite directions. Any suitable reversible drive mechanism may be used in place of the gear wheel and engaging toothed arrangement shown, such as a reversibly driven pulley or lever arrangement suitably linked to the two upper vessels of the system. The motor is controlled to drive first one of the upper vessels up to the top of its stroke while driving the other vessel down to the bottom of its stroke, and is then reversed to drive the first vessel down while driving the second vessel up. FIG. 3 shows vessel 12 at the top of its cycle while vessel 10 is at the lowermost position in its cycle.

As shown in FIGS. 1 and 3, the outlets 30 and 32 from the two heat exchangers are connected via check valves 58 and 60, respectively, to a single distillate outlet conduit 62 in which an outlet valve 64 is provided. The check valves prevent reverse flow into the heat exchanger coils from the outlet. The lower vessels 18 and 20 have inlets 66 and 68 connected via conduits 70, 71 and 72 to an inlet 73 for connection to a suitable source of liquid to be distilled, such as sea water or sewage.

A priming fill inlet valve 74 is provided at inlet 73, and a source inlet valve 75 is provided in conduit 70. Inlet check valves 76 and 78 are provided in each of the conduits 71 and 72 which connect conduit 70 to the inlets 66 and 68, respectively. The two inlets are also connected to a level control assembly 80 which controls the minimum level of liquid in each of the vessels. The control assembly 80 comprises a liquid reservoir or float chamber 81 with a suitable float or level valve 82, and is connected to the source via conduit 83, and to the conduits 71 and 72 via outlet conduit 84 and control valve 86. The source water level in the float chamber must be above the highest possible position of the piston seals 114, to ensure that the liquid level cannot drop below this point. The elongate upper vessels extend at least 33 feet above the liquid level in the control assembly in the normal position shown in FIG. 1, to ensure that a vacuum can be drawn by reciprocating the vessels, as explained below.

The source inlet is also connected to the heat exchangers via conduit 88, and conduits 90 and 92 connected to the respective heat exchanger outlets, to allow the heat exchangers to be filled with liquid at start-up of the apparatus. A heat exchanger or condenser priming inlet valve 94 and 96 is provided in each of the conduits 90 and 92. The lower ends of each of the lower vessels are connected to a suitable solids drainage assembly via drain outlets 98 and 99 each having a drain control valve 102 and 104, respectively. Return conduit 110 connects the outlet 96 to the level control assembly via source return valve 112.

Operation of the apparatus to distill a suitable liquid such as sea water or brackish water will now be described with reference to FIG. 3, which illustrates the operating system schematically. The apparatus must first be primed by filling with the liquid to be distilled and expelling all air from the system. This is done by first raising one of the upper vessels to the top of its cycle, simultaneously lowering the other vessel to the position indicated in FIG. 3. At this point, the main priming fill or inlet valve 74, the source fill valve 75, the condenser fill valves 94 and 96, and the priming bleed valves 46 and 48 are opened. The distillate outlet valve 64, return valve 112, and drain valves 102 and 104 will be closed at this point.

The vessels and condenser coils are allowed to fill with liquid until the lowermost of the two upper vessels, which is vessel 10 in FIG. 3, fills to the top. The priming bleed valve 46 at the top of that vessel is then closed. Liquid is allowed to continue filling the upper vessel 12 until it is also filled to the top. At this point all air will be bled from the system, including the vessels and the condenser coils. The priming fill inlet valve 74, source fill valve 75, condenser fill valves 94 and 96, and the priming bleed valve 48 at the top of the uppermost vessel 12 are now all closed. The source return valve 112 at the bottom of the priming vessel 12 and 20 is then opened, connecting that vessel to the level control assembly. This initiates the starting level of the liquid after priming. The liquid level in the uppermost vessel will drop to about 33 feet above the source level in the float reservoir (as by the atmospheric pressure of 15 P.S.I.), leaving a vacuum in the space above the liquid level. The source inlet valve 73 and the distillate outlet valve 64 are both opened at this point.

The motor is then turned on to drive the vessels through ¼ of a cycle until they are both at the same level. This will leave small spaces above the liquid level in each upper vessel. The starter heaters 34 and 36 are turned on to vaporize some of the liquid in the containers. In the case of water, when the temperature reaches about 200 degrees F, the heaters are turned off. At this point the space above the water level in the vessels will be filled with steam.

The system is now ready to start operation to distill the liquid in the vessels. The motor is switched on, causing vertical reciprocation of the upper vessels. One vessel will be moving upwardly while the other is moving down, and vice versa. Consider first the situation where upper vessel 10 is moving up to the top of its stroke while vessel 12 is moving down. The liquid in vessel 12 will act as a piston causing the space within the vessel and above the liquid level to be decreased, increasing the vapor pressure in that space. This will increase the intrinsic heat of the vapor in the space, and vapor will be conducted through conduit 40 and check valve 44 into the heat exchanger 22 in vessel 10. Vessel 10 will, in the meantime, be moving up, increasing the space above the water level in that vessel and lowering the vapor pressure. The distillate entering heat exchanger 22 will therefore be cooled and will condense into a liquid, such as desalted water where the apparatus is used for removing salt and other minerals from sea water, for example. The resultant distillate passes through the outlet 30 of heat exchanger 22, and through check valve 58, conduit 62 and outlet valve 64 to the outlet, from which it can be delivered to a suitable collection area or container, for example.

The two upper vessels then change direction, with vessel 10 moving down to compress the vapor in the space above its liquid level so that vapor is conducted through conduit 38 and check valve 42 to the heat exchanger 24 in vessel 12. Vessel 12 will at the same time be moving upwardly, expanding the space above the liquid level, so that some of the source water in that vessel gives up its heat into vapor, while vapor entering heat exchanger 24 from vessel 10 is cooled and condenses into a purified distillate which is conducted through outlet 32, check valve 60, conduit 62 and outlet valve 64 to a suitable collection device. Heat lost as the source water vaporizes during the upward stroke is replaced by heat given up during condensation of the vapor entering the heat exchanger from the other vessel. The cycling continues, with source liquid entering the vessels to maintain the minimum liquid level via valve 86 as controlled by the level control assembly. This system can be used, for example, to distill sea water for drinking purposes. As the cycling continues, the salt in the remaining liquid will become more concentrated and will tend to sink to the bottom of the vessels, where it can be recovered via the drain outlets 98 and 99. The minerals in sea water are of significant value, and this apparatus allows the minerals to be collected and subsequently separated for use in various applications. It is likely that the minerals recovered may cover the expense of running the distillation apparatus. The system can also be used to distill or purify other liquids, for example to remove solids from sewage or brackish water.

The distillation apparatus described above allows distillation of liquids such as sea water efficiently and inexpensively, and also allows collection and recovery of valuable minerals from the liquids. The heater elements are only used during start up, and after that the only power consumed is that required for running the reciprocating drive mechanism. The elongate upper vessels must be fairly strong. They may be of metal such as stainless steel or the like, for example.

Although a preferred embodiment of the invention has been described above by way of example only, it will be understood by those skilled in the field that modifications may be made to the disclosed embodiment without departing from the scope of the invention, which is defined by the appended claims.

We claim:

1. A distillation apparatus, comprising:
   a pair of vertically arranged, side by side two-part vessels;
   each two-part vessel comprising a lower vessel having an open upper end, and a vertically arranged, elongate upper vessel having an open lower end, and means for slidably mounting said upper vessel at its lower end in said lower vessel;
   a first heat exchanger mounted in a first one of the upper vessels and having an inlet and an outlet;
   a second heat exchanger mounted in a second one of the upper vessels and having an inlet and an outlet;
   a first conduit connecting the upper end of the first upper vessel with the inlet of the second heat exchanger;
   a second conduit connecting the upper end of the second upper vessel with the inlet of the first heat exchanger;
   supply means connected to each of the two-part vessels for supplying a liquid to be distilled to the vessels;
   outlet conduits connected to the outlets of both heat exchangers for conveying distillate out of the vessels;
   reciprocating drive means connected to the upper vessels for alternately driving the upper vessels up and down in opposite directions to simultaneously effect compression and heating of vapor in a space above a liquid level in the first one of the upper vessels and expansion and cooling of vapor in a space above a liquid level in the second one of the upper vessels; and
   solid collection means at the lower end of each of the lower vessels for collecting solids separated out from the liquid in the vessels.

2. The apparatus as claimed in claim 1, wherein each lower vessel has an outlet at its lower end, the solid collection means comprising outlet conduits connected to said outlets, a drain valve being provided in each outlet conduit for controlling draining of solids from said vessels.

3. The apparatus as claimed in claim 1, wherein the means for slidably mounting includes seal means at the lower end of each upper vessel for slidable sealing engagement with the respective lower vessels.

4. The apparatus as claimed in claim 1, wherein the supply means includes level control means connected to said vessels for maintaining the level of liquid in said vessels above a predetermined minimum level.

5. The apparatus as claimed in claim 4, wherein the elongate upper vessels extend at least 33 feet above said predetermined minimum level.

6. The apparatus as claimed in claim 1, wherein said lower vessels each have an inlet opening, and the supply means comprises:
   inlet means for connection to a source of liquid to be distilled;
   a third conduit connecting said inlet means to said inlet openings;
   priming valve means in said third conduit for controlling the supply of liquid to said vessels
   a fourth conduit connecting said inlet means to said heat exchangers; and
   a condenser priming valve in said fourth conduit for controlling the supply of liquid to said heat exchangers.

7. A method of distilling liquids, comprising the steps of:
   supplying liquid to be distilled to a pair of two-part vessels so as to leave a space above the liquid level in each vessel, each two-part vessel comprising an upper, vertically extending elongate vessel having an open lower end and a lower vessel having an open upper end in which said upper vessel is slidably mounted;
   reciprocating said upper vertically extending elongate vessels up and down in opposite directions in said lower vessels;
   compressing and heating vapor in each upper vessel during its downward stroke and expelling vapor from the upper end of the downwardly moving vessel;
   collecting vapor expelled from the upper end of each upper vessel during its downward stroke and conducting the collected vapor into a heat exchanger located in the other, upwardly moving upper vessel;
   condensing vapor in the heat exchanger;
   conducting the condensed distillate to an outlet of said heat exchanger; and
   draining collected solids from the lower end of each lower vessel and collecting the drained solids.

* * * * *